W. PFANNKUCH.
PROTECTIVE DEVICE FOR CABLES.
APPLICATION FILED NOV. 3, 1914.
1,161,723.   Patented Nov. 23, 1915.
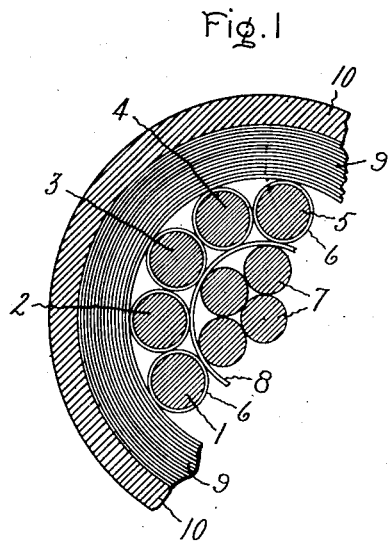
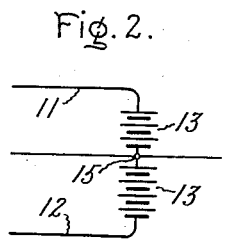
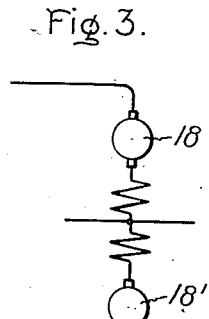
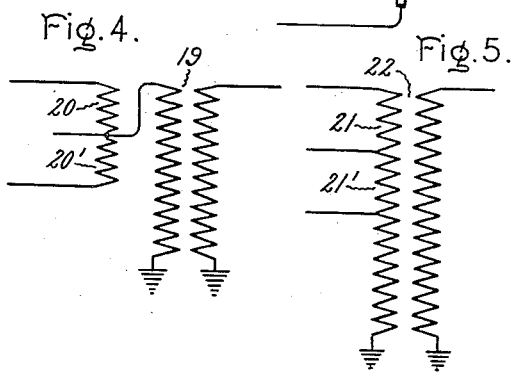
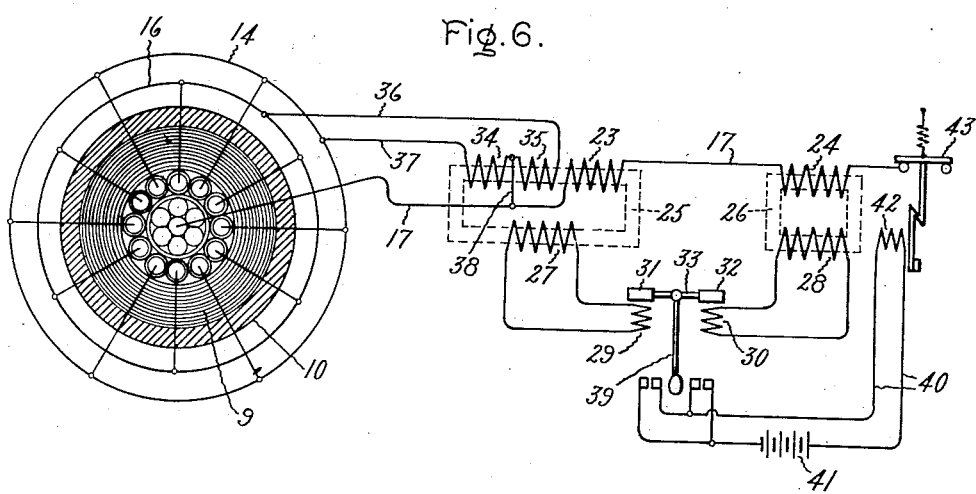
Witnesses:
Inventor:
Wilhelm Pfannkuch,
by
His Attorney.

UNITED STATES PATENT OFFICE.

WILHELM PFANNKUCH, OF BERLIN-NIEDERSCHÖNWEIDE, GERMANY, ASSIGNOR TO GENERAL ELECTRIC COMPANY, A CORPORATION OF NEW YORK.

PROTECTIVE DEVICE FOR CABLES.

1,161,723. Specification of Letters Patent. Patented Nov. 23, 1915.

Application filed November 3, 1914. Serial No. 870,146.

*To all whom it may concern:*

Be it known that I, WILHELM PFANNKUCH, a subject of the King of Prussia, residing at Berlin-Niederschönweide, Germany, have invented certain new and useful Improvements in Protective Devices for Cables, of which the following is a specification.

The present invention relates to the protection of cables for distributing electric energy against destructive short circuits.

It is the object of my invention to provide means whereby an incipient breakdown in the cable may be met by proper emergency measures, before a severe short-circuit has occurred with its accompanying destructive reactions upon the entire system.

Investigations of cables which had been subjected to disruptive discharges show that the electric field strength had exceeded safe limits first at the outer layers of the cable conductors and that the impregnated insulating material filling the spaces between adjacent conductors had become decomposed and carbonized. It has also been shown that only subsequently the heat liberated by the decomposition of the impregnating material caused the gradual destruction of the inner paper layers and thus by a progressive destruction of the other layers a complete short-circuit of the cable. The formation of carbon particles from the impregnating material always precedes a short-circuit. This fact is utilized in my present invention, in accordance with which groups of the outer layers of cable conductors are insulated from each other and subjected to a moderate difference of potential, whereby a suitable alarm or cut-out device or devices may be actuated when conducting bridges of carbon particles are formed between adjacent insulated conductors of different groups.

My invention will be best understood by reference to the following description taken in connection with the drawing in which—

Figure 1 is a fragmental diagrammatic cross sectional view of a cable constructed in accordance with my invention; Figs. 2 to 5, inclusive, illustrate various connections to auxiliary sources to establish a difference of potential between insulated groups of conductors, and Fig. 6 is a diagram of a protective system in which the auxiliary potential between cable conductors is derived from the main source of energy.

The cable illustrated in Fig. 1 comprises a set of conductors, the outer layer of conductors of which are numbered 1, 2, 3, 4, 5, each of which is insulated from the neighboring conductors by a relatively thin layer of insulation 6, such as paper, and from the inner group of conductors 7 by a layer of insulation 8. The cable conductors are insulated in the usual manner by an impregnating material and are surrounded by a layer of suitable insulation 9 consisting of paper or the like and an outer sheath 10 of metal or other suitable protective material.

Groups consisting respectively of the odd numbered and the even numbered cable conductors are connected to opposite terminals 11 and 12 of an auxiliary source of energy, such as a storage battery 13, shown in Fig. 2, of a moderate potential, say about 100 volts or thereabout. The method of connection is shown in Fig. 6 in which one set of cable wires is connected to a conductor 14 and another set of alternate cable wires to a conductor 16. The middle group of cable conductors 7, Fig. 1, is connected to an intermediate point of potential 15 of the auxiliary source. In Fig. 6 this central group of conductors is shown included in the main line 17.

It should be understood that although the outer cable wires are subjected to a superimposed auxiliary potential, they are also carrying the main current in parallel with the inner group of conductors. Of course, in place of a battery any other convenient source of current may be used in a similar manner. For example, two small auxiliary dynamo electric machines as shown at 18, 18', Fig. 3, or two special auxiliary windings on the supply transformer 19 as shown at 20, 20', Fig. 4, or taps from the end turns 21, 21' of the secondary of the transformer 22, Fig. 5, according to the familiar compensator connection, may be used as auxiliary sources. Instead of describing in detail how each of these auxiliary sources may be used to operate an alarm or cut-out device when a local break-down occurs in the cable, I will describe in detail a system in which the auxiliary current is derived from the main line current carried by the cable, and from this system it will follow how other auxiliary sources of potential may be used to accomplish the same general purpose.

In Fig. 6 the primary transformer windings 23 and 24 are wound on the separate cores 25 and 26 and are connected in series with the main line 17, traversed by the energy transmitted by the cable. On the core 25 is located a secondary winding 27 and on the core 26 a secondary winding 28, the coils being connected to produce opposing and substantially equal tractive effects in the solenoids 29 and 30. The armatures 31 and 32 of these solenoids are mounted on a common carrier 33 and as long as the tractive effects of the solenoids are equal no motion will result. On the core 25 are also located the auxiliary windings 34, 35, wound so as to oppose each other and having their terminals connected to the group conductors 14 and 16 by the conductors 37, 36, respectively. The adjacent terminals of the coils 34, 35 are connected in common by a conductor 38 to the main line 17, and thus to the inner group of cable conductors. The coils 34, 35 thus superimpose an additional potential respectively assisting or opposing upon the line potential carried by the two groups of the outer layer of cable conductors. If a break-down occurs between the sets of outer conductors the result will be a decrease in the current in the secondary 27, thus unbalancing the equilibrium between the armatures 31 and 32 causing the arm 39 to be moved to close the contacts in the local circuit 40. This local circuit may contain a battery 41 or other source of energy. The closure by the relay of the contacts and the local circuit may actuate any electro-responsive device to either indicate by sound an alarm that the cable is in danger of short-circuiting, or as shown in Fig. 6, the local circuit may contain a trip coil 42 of a circuit breaker 43 which will operate to disconnect the cable from the system. My invention thus enables a prompt interruption of the circuit before the defect in the cable is developed far enough to produce a destructive short circuit. It facilitates determining the cause of the defect and reduces the expense of remedying the difficulty. The existence of the insulated conductor wires in the outside layer of the cable permits the location of the defect to be determined with accuracy.

My device does not require any special auxiliary cable as it is applicable to any kind of current of a single phase or polyphase alterating current or direct current, and any type of cable.

What I claim as new and desire to secure by Letters Patent of the United States, is,—

1. In a cable comprising a plurality of conductors, conductive means for electrically interconnecting the outer layer of said cable conductors into groups, a layer of insulation between a plurality of said groups of conductors, means for impressing a moderate potential between said insulated groups, and electro-responsive means actuated by an exchange of current between said insulated groups by a defect in the insulation.

2. In a cable comprising a plurality of conductors carrying current at the same potential, a thin layer of insulation between a plurality of groups of the outer layer of said conductors, electrical connections between the individual conductors of each group, means for establishing a moderate difference of potential between said insulated groups, and electro-responsive means actuated by an exchange of current between said groups by a break-down in the insulation.

3. In a cable comprising a plurality of conductors, means for insulating adjacent conductors in the outer layer from each other, connections grouping alternate conductors of said insulated outer layer, a transformer having a primary winding connected in series with the conductors of said cable, and a plurality of secondary windings having terminals connected respectively to said insulated groups, a common connection between the opposite terminals of said secondary windings and an inner layer of cable conductors, and electro-responsive means actuated by an exchange of current between said groups of cable conductors.

In witness whereof, I have hereunto set my hand this 30th day of October, 1914.

WILHELM PFANNKUCH.

Witnesses:
 WOLDEMAR HAUPT,
 HENRY HASPER.